United States Patent [19]

Gaul

[11] Patent Number: 4,785,158

[45] Date of Patent: Nov. 15, 1988

[54] FLAME ARRESTOR AND METHOD OF MANUFACTURE

[75] Inventor: Alan R. Gaul, Mansfield, Mass.

[73] Assignee: Dresser Industries, Inc., Dallas, Tex.

[21] Appl. No.: 148,124

[22] Filed: Jan. 26, 1988

Related U.S. Application Data

[63] Continuation of Ser. No. 29,916, Mar. 25, 1987, abandoned.

[51] Int. Cl.[4] .............................................. B23K 15/00

[52] U.S. Cl. ................................ 219/121.14; 48/192; 138/37

[58] Field of Search ................ 219/121 ED, 121 LD, 219/121 EC, 121 LC, 121 PK, 121 PJ; 138/37; 48/192

[56] References Cited

U.S. PATENT DOCUMENTS 4,081,656 3/1978 Brown .................... 219/121 PK X

OTHER PUBLICATIONS

"Pipes Positioned by Water-Soluble Metal", *Mechanical Engineering,* Jul. 1986, p. 19.

*Primary Examiner*—C. L. Albritton

[57] ABSTRACT

A method of spacing the elements of a flame arrestor and securing that spacing in a simple.and economical manner. A shim is used to space the elements, the elements are welded together and the shim is removed. This leaves a controlled flow path between the elements but the spacing is such to prevent the propagation of a flame through the arrestor.

12 Claims, 1 Drawing Sheet

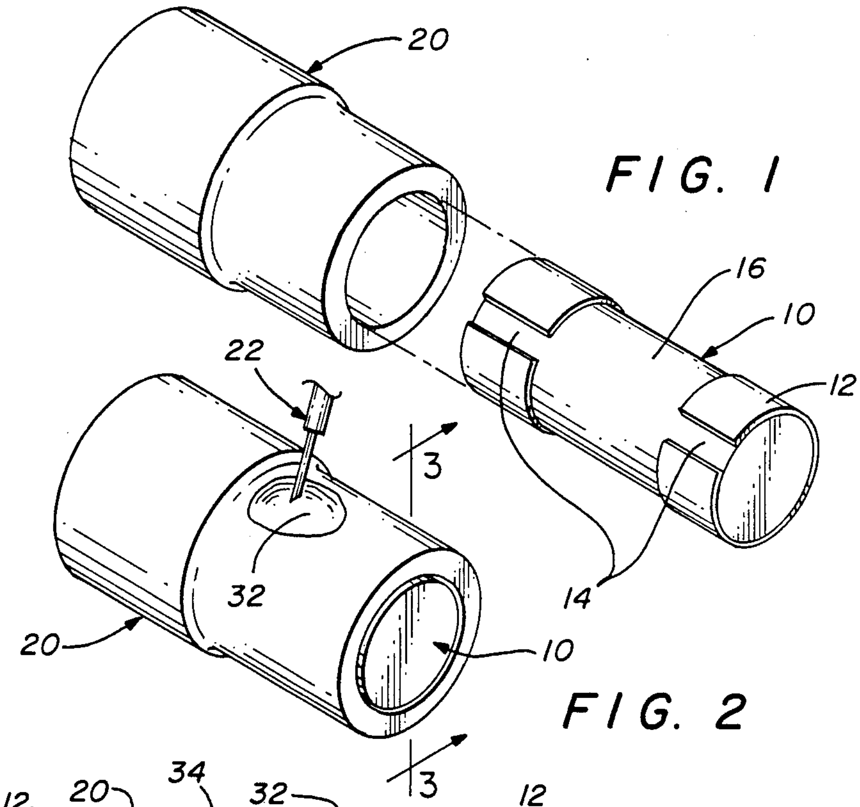
FIG. 1
FIG. 2
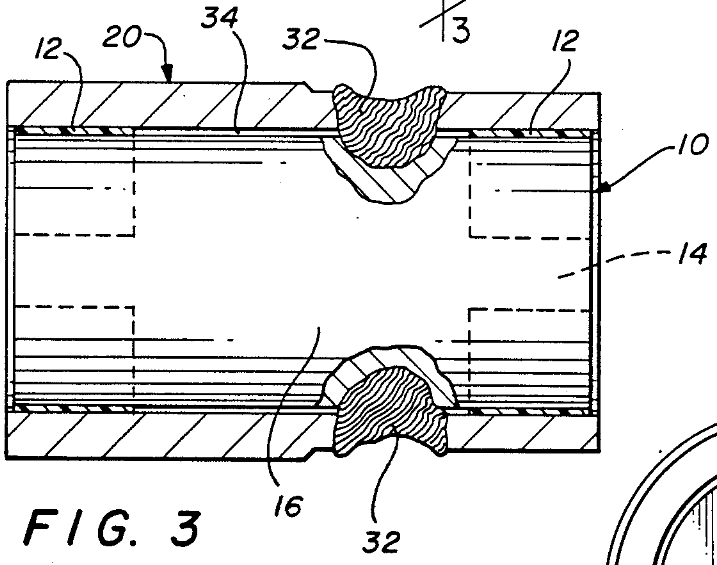
FIG. 3
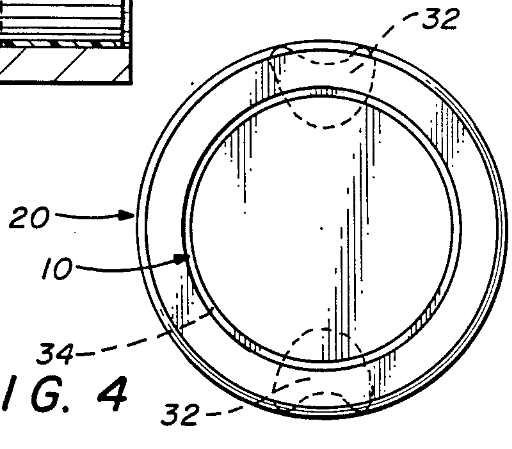
FIG. 4

FLAME ARRESTOR AND METHOD OF MANUFACTURE

This application is a continuation of application Ser. No. 29,916, filed Mar. 25, 1987, now abandoned.

TECHNICAL FIELD

This invention relates to a precisely manufactured flame arrestor and to a simple, economical method of manufacture that achieves the precise tolerances required in an arrestor to provide a flameproof path.

BACKGROUND

Flame arrestors are used in pneumatic control devices to provide a flameproof path for the pneumatics into and out of a control or instrument. Flame arrestors provide a restricted pneumatic passage over an extended length such that a flame cannot propagate through the passage.

Several types of arrestors are known in the art. A sintered metal arrestor has been commonly used; however, recently adopted European standards no longer permit the use of this type of flame arrestor. Another type is a Lisk arrestor which is comprised of layers of crimped and flat sheet metal that are wrapped together and held in a case by a rivet. Other types include the parallel plate types that usually consist of flat plates with a slot ground into the plate to a depth equal to the maximum gap allowed for the length of the flame path. The plates are then stacked and bonded together at the unground area to form a series of parallel flame retardant paths. This type of construction is quite expensive due to the grinding of the slot, and the arrestors are more bulky due to the solid area that supports the gap and forms the bond area. Another type of flame arrestor would be a gear shaped rod that is pressed into a tube with the flameproof path provided between the gear teeth. This type of arrestor would be quite expensive as it requires the machining of the fine gear teeth, and it would provide a restricted flow area. These types of flame arrestors are expensive to make and require fine machining of the various parts.

Since the allowable gap dimensions in small flame arrestors are very small, manufacture of a small flame arrestor is particularly difficult and expensive. Thus, a need exists for any easy, economical method of manufacturing precision flame arrestors both small and large that would meet the necessary standards here and abroad.

SUMMARY OF THE INVENTION

The present invention teaches a method of precisely spacing the elements of a flame arrestor and securing that spacing within the required tolerances to provide a flameproof path in pneumatic control devices. The precision ground elements of a flame arrestor are spaced by using a shim between the elements such that the shim spaces the elements within the required flameproof tolerances. The shim is gapped where necessary to allow weld gases to escape. The assembly is welded in appropriate locations to hold the elements securely together. The assembly is then heated so as to burn out or dissolve the shim leaving a controlled flow path between the elements for pneumatic flow. This provides a precision-made flame arrestor that meets the required standards.

According to one embodiment of the invention, the method taught by the present invention is used to construct a rod and tube type flame arrestor. A precision ground rod and tube are used such that the rod will fit inside the tube, and when held concentrically by the shim, it provides a radial gap within the required tolerances for a flameproof path. The rod is welded to the tube and the assembly is heated to dissolve the shim. The method taught by the present invention may be used to produce various types and sizes of flame arrestors.

BRIEF DESCRIPTION OF THE DRAWINGS

For a more complete understanding of the present invention and other advantages of it, a Detailed Description is given in conjunction with the accompanying Drawings, in which like reference characters denote like parts in all views and wherein:

FIG. 1 is an exploded view of a rod and tube flame arrestor showing the rod with a shim wrapped circumferentially around the rod at each end being inserted into the tube;

FIG. 2 shows a perspective view of a rod and tube flame arrestor;

FIG. 3 shows a longitudinal cross-sectional view along line 3—3 showing a rod welded inside a tube; and FIG. 4 shows an end view of a rod and tube flame arrestor.

DETAILED DESCRIPTION

The present invention relates to a flame arrestor and method of manufacturing the same that is economical and easy to machine and to assemble while maintaining the precise tolerances necessary to make the arrestor flameproof. The invention relates to flame arrestors that can be used in pneumatic control devices to prevent the propagation of a flame. Particularly, the invention relates to a rod and tube type flame arrestor, but the method of manufacturing can also be applied to other types of arrestors such as the parallel plate type.

One embodiment of the present invention is a method for making a rod and tube type flame arrestor. The dimensions of the rod and tube to be used in the invention must be such that the diameter of the rod is less than the inner diameter of the tube, and the difference between the diameter of the rod and the inner diameter of the tube is within the required tolerances for a flameproof path. This difference includes both the diameter difference and radial difference when the rod is held almost concentrical within the tube. Precision ground stock is used for the rod and tube with the rod being precision ground on the outer surface and the tube being precision ground on the inner surface. The rod 10 is prepared as shown in FIG. 1 with a shim 12 wrapped circumferentially around rod 10 near both ends, or alternatively in the middle, leaving gaps 14 in the shim to allow weld gases to escape. The shim is preferably of a material that will decompose when heated in a nonoxidizing environment or dissolve in a solvent. Most preferably, the shim is a plastic tape. The shim 12 is wrapped around rod 10 in such a manner as to leave a free weld zone 16 in the center of the surface of rod 10. Rod 10, with the shim attached, is then inserted inside tube 20. The shim 12 is of such a thickness in relation to the diameter difference between rod 10 and the inside of tube 20 that when the rod with the shim attached is inserted into the tube, the rod is held practically concentric inside the tube by the shim 12.

As shown in FIG. 2, the tube 20 is then welded, preferably using an electron beam welder 22, to rod 10 at two spots 32 in the free weld zone 16 that are preferably about 180° apart. Alternatively, the welding may be done in the center as illustrated in FIG. 2 or at the ends of the rod and tube. A cross-sectional view along the line 3—3 as shown in FIG. 3 shows the two welds 32 in the middle section of the assembly about 180° apart.

After the welding, the shim is removed by one of several methods. The assembly may be heated in a non-oxidizing environment such as hydrogen, nitrogen, argon or even a vacuum to decompose the shim. Another method of removing the shim would be to immerse the assembly in a solvent including organic solvents and acids. Preferably the welded assembly is heated in a hydrogen atmosphere at 1200° F. for 20 minutes to decompose the shim 12. The assembly then may be ultrasonically cleaned to remove any residue. This leaves the rod 10 held nearly concentrically within tube 20 by the welds 32 such that the spacing between the rod and the tube allows for pneumatic flow but is within the critical diameter and radial gap tolerances necessary to meet prescribed standards to provide a flameproof path. FIG. 4 shows an end view of the assembled rod and tube flame arrestor with a uniform circumferential air gap 34 between rod 10 and tube 20. The assembly is designed such that gap 34 is less than the maximum allowable radial and diameter differences as known in the art for providing a flameproof path across the length of the arrestor.

In a flame arrestor, the critical feature is the spacing between the pieces such that it allows for the flow of gas through the device but prevents the propagation of a flame. The volume flow of the gas and the length of the flame arrestor determine the critical spacing requirements. These standards are well known in the industry and are established by regulations in some countries. As one example, European Standards provide that for a volume of 400 cubic centimeters and a rod and tube arrestor having a length greater than 0.374 inches (9.5 mm), the diameter difference between the rod and the tube can be only 0.00591 inches (0.15 mm) maximum, and the radial gap cannot be greater than 0.00394 inches (0.10 mm). (European Standards EN50018).

As an example of one construction of the invention that meets these precise requirements, a rod of length 0.4 inches is precision ground to a diameter of 0.1842±0.0001 inches. The inside diameter of a tube is reamed and honed to 0.1898±0.0002 inches. This maintains a diameter differences equal to or less than 0.00591 inches as required by EN50018. The tube is cut at a length of 0.402 inches to insure a flame path the full length of the rod. A plastic tape with a thickness of 0.0025 inches and width of 0.080 inches serves as the shim and is wrapped circumferentially around the rod near both ends of the rod leaving a gap of 0.04 inches in the wrap to allow weld gases to escape. A shim of this thickness will hold the rod practically concentric within the tube as a diameter gap of only 0.0009 exists between the tube, th shim and the rod. With a radial gap standard of 0.00394 inches, the tolerance in the concentricity of the rod within the tube is 0.001 inches. The selected shim, therefore, adequately spaces the rod within the tube. Holding the rod to this degree of concentricity within the tube is critical in order to provide the maximum amount of flow area between the rod and tube while still meeting the radial gap requirements. In the construction just mentioned, the radial gap between the rod and tube is 0.0028±0.0002 inches if the rod was held perfectly concentric within the tube. A diameter gap of 0.00091 with the shim inserted allows the rod to be held within the tube such that the maximum radial gap that could occur is less than the 0.00394 inches maximum radial gap allowed by the European Standards. To complete the construction, the tube is electron beam welded to the rod at two spots in the center of the tube, or alternatively at the ends, approximately 180° apart. The assembly is then heated to a temperature sufficient to dissolve the plastic shim.

Since the allowable gap dimensions are very small, manufacture of such a small flame arrestor using previously known methods is difficult. The present method of manufacture allows for the precise manufacture of even small flame arrestors. As the size of the flame arrestor increases, a shim with the appropriate thickness may be selected. The insertion of a removable shim provides an inexpensive means to temporarily fix and hold the pieces of the flame arrestor to the required precise gap dimensions. Welding the pieces together than permanently fixes the precise dimensions, and the weld results in only a small area that interferes with the flow through the arrestor.

The use of a removable shim in the method of manufacture just described provides an economical means of holding the rod concentrically within the tube to the required degree of tolerance. The present invention may be used to construct a nonconcentric rod and tube flame arrestor, but a concentric construction is preferred as the concentric configuration provides a greater flow area for the same radial gap requirement. If a nonconcentric configuration in which the rod contacted one side of the tube was used, the diameter of the rod would have to be increased from the concentric rod diameter in order to meet the radial gap requirement. A larger rod provides less flow area between the rod and the tube requiring a greater pressure to achieve the same flow rate as a concentric configuration allows. Using the same dimensions and requirements as illustrated above, the flow rate for the concentric construction is more than three times greater than the flow rate for the nonconcentric arrestor with the larger rod for the same pressure drop across the arrestors. The present invention, therefore, provides a means for positioning the rod within the tube that allows for a smaller diameter rod to be used thereby allowing a greater gas flow rate through the flame arrestor.

This method of manufacture can also be used to construct various types and sizes of flame arrestors. For example, to construct a parallel plate type of flame arrestor, precision ground plates are alternatively stacked with sheets of the shim material. Spaces may be left in the shim to provide a weld zone. The plates may be welded together as each successive plate is stacked on the underlying plate, or the plates may be welded at the ends after all the plates have been stacked together. The assembly then may be heated to remove the shim. Again, the shim must not have a thickness greater than that allowed gap for a flameproof path through a parallel plate arrestor. The method of inserting a shim, welding the pieces together and removing the shim allows for precision manufacture of flame arrestors. The method of manufacturing taught by the present invention achieves these tolerances in an economical and simple manner without requiring the fine machining of many parts.

As will be apparent to persons skilled in the art, various modifications, adaptations and variations of the foregoing specific disclosure can be made without departing from the teachings of the present invention.

I claim:

1. A method of manufacturing a flame arrestor which comprises:

using a multiplicity of precision ground stock pieces, spacing the pieces with a shim that is of such a thickness that the spacing between the pieces provided by the shim is within the necessary tolerances to provide a barrier to the propagation of a flame through the arrestor, welding the pieces together, and removing the shim from between the pieces to leave a gap between the pieces such that the gap is within the tolerances necessary to provide a flameproof path through the arrestor.

2. The method of claim 1 wherein the multiplicity of precision ground pieces includes a rod and a tube, said rod and tube being dimensioned such that the rod can be inserted inside the tube and the diameter difference between the rod and the inner diameter of the tube is less than the maximum diameter difference that would provide a flameproof path through the rod and tube.

3. The method of claim 1 wherein the multiplicity of precision ground pieces includes parallel plates.

4. The method of claim 1 wherein the welding of pieces is done by using an electron beam welder.

5. The method of claim 1 wherein the shim is removed by decomposing it in a nonoxidizing environment.

6. The method of claim 1 wherein the shim is removed by dissolving it with a solvent.

7. A method of manufacturing a rod and tube type flame arrestor which comprises:

using a rod with a precision ground outer surface;

using a tube with a precision ground inner surface such that the inner diameter of the tube is greater than the diameter of the rod but the difference between the inner diameter of the tube and the diameter of the rod is less than the maximum tolerances required to provide a flame barrier;

wrapping the rod circumferentially with a removable shim and leaving a free weld zone, said shim being of such a thickness to allow the rod to be inserted and held almost concentrically inside the tube;

inserting the rod inside the tube;

welding the tube to the rod at two points nearly 180° apart; and removing the shim.

8. The method of claim 7 wherein the welding is performed near the center of the tube, and wherein the shim is wrapped at both ends of the rod.

9. The method of claim 7 wherein the welding is performed near the ends of the tube.

10. The method of claim 7 wherein the shim is removed by heating the assembly in a nonoxidizing environment.

11. The method of claim 7 wherein the shim is removed by dissolving it in a solvent.

12. The method of claim 7 wherein the shim is a plastic tape.

* * * * *